United States Patent
Hayes et al.

(10) Patent No.: US 10,011,147 B2
(45) Date of Patent: Jul. 3, 2018

(54) AXLE ASSEMBLY HAVING AN ADJUSTER RING

(71) Applicant: ArvinMeritor Technology, LLC, Troy, MI (US)

(72) Inventors: Brian D. Hayes, Newark, OH (US); Robert J. Martin, Newark, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 339 days.

(21) Appl. No.: 14/851,000

(22) Filed: Sep. 11, 2015

(65) Prior Publication Data

US 2017/0072745 A1 Mar. 16, 2017

(51) Int. Cl.
*B60B 35/12* (2006.01)
*B60B 35/18* (2006.01)
*F16H 57/037* (2012.01)
*B60B 35/16* (2006.01)
*F16H 48/40* (2012.01)

(52) U.S. Cl.
CPC ........... *B60B 35/125* (2013.01); *B60B 35/16* (2013.01); *B60B 35/18* (2013.01); *F16H 57/037* (2013.01); *F16H 2048/405* (2013.01)

(58) Field of Classification Search
CPC ....... B60B 35/125; B60B 35/16; B60B 35/18; F16H 57/037
See application file for complete search history.

(56) References Cited

U.S. PATENT DOCUMENTS

| 1,512,402 | A | * | 10/1924 | Burrows | F16H 57/022 475/225 |
| 3,715,936 | A | * | 2/1973 | Jones | F16H 48/08 475/246 |
| 4,733,578 | A | | 3/1988 | Glaze et al. | |
| 5,673,777 | A | * | 10/1997 | Ziech | F16H 48/08 192/108 |
| 6,200,240 | B1 | | 3/2001 | Oates | |
| 7,108,428 | B2 | * | 9/2006 | Ason | F16C 25/06 29/898.09 |
| 7,794,153 | B2 | * | 9/2010 | Szczepanski | B60B 35/18 384/519 |
| 8,480,531 | B2 | | 7/2013 | Pan et al. | |
| 8,616,780 | B2 | | 12/2013 | Kwasniewski et al. | |
| 8,777,493 | B2 | | 7/2014 | Kwasniewski et al. | |
| 2005/0245342 | A1 | | 11/2005 | Pontanari et al. | |
| 2009/0082162 | A1 | | 3/2009 | Zink | |
| 2012/0295753 | A1 | * | 11/2012 | Kwon | F16H 48/40 475/246 |

(Continued)

FOREIGN PATENT DOCUMENTS

EP 2551554 A1 1/2013
EP 2677185 A1 * 12/2013

OTHER PUBLICATIONS

Define opposite—Google Search, google.com., Oct. 6, 2017.*

(Continued)

*Primary Examiner* — Vinh Luong
(74) *Attorney, Agent, or Firm* — Brooks Kushman P.C.

(57) ABSTRACT

An axle assembly having a bearing support, a roller bearing assembly, an adjuster ring, and a locking fastener. The adjuster ring and the roller bearing assembly may be disposed on and may receive a bearing journal of the bearing support. The locking fastener may inhibit rotation of the adjuster ring.

20 Claims, 4 Drawing Sheets

(56) References Cited

U.S. PATENT DOCUMENTS

2013/0029798 A1* 1/2013 Martin, III .............. F16H 48/40
            475/231
2017/0072745 A1* 3/2017 Hayes ................... B60B 35/125

OTHER PUBLICATIONS

Define on—Google Search, google.com., Oct. 6, 2017.*
Define shim—Google Search, google.com., Oct. 8, 2017.*
European Patent Office, Extended Search Report for the corresponding European Patent Application No. 16182698.7 dated Apr. 4, 2017.

* cited by examiner

AXLE ASSEMBLY HAVING AN ADJUSTER RING

TECHNICAL FIELD

This patent application relates to an axle assembly having an adjuster ring.

BACKGROUND

A differential assembly having an inverted bearing and an adjusting ring is disclosed in U.S. Pat. No. 8,480,531.

SUMMARY

In at least one embodiment, an axle assembly is provided. The axle assembly may include a housing assembly, a bearing support, a first roller bearing assembly, an adjuster ring, and a locking fastener. The bearing support may be disposed on the housing assembly and may include a body and a bearing journal. The body may have a locking fastener hole. The bearing journal may extend from the body and may have a bearing journal hole, an outer bearing journal surface, and a threaded portion. The bearing journal hole may be disposed along an axis and may be adapted to receive an axle output shaft. The outer bearing journal surface may be disposed opposite the bearing journal hole. The threaded portion may be disposed proximate the outer bearing journal surface. The first roller bearing assembly may have a first inner race and a first outer race. The first inner race may be disposed on the outer bearing journal surface. The first outer race may be disposed opposite the first inner race and may facilitate rotation of a ring gear. The adjuster ring may be disposed on the bearing journal and the first inner race. The adjuster ring may include a threaded region and a set of openings. The threaded region may receive and mate with the threaded portion. The set of openings may be arranged around the axis. The locking faster may be received in the locking fastener hole and in a member of the set of openings to inhibit rotation of the adjuster ring about the axis.

In at least one embodiment, an axle assembly is provided. The axle assembly may include a differential carrier, a bearing support, a first roller bearing assembly, an adjuster ring, and a locking fastener. The bearing support may include a body and a bearing journal. The body may be disposed on the differential carrier and may have a locking fastener hole. The bearing journal may extend from the body toward the differential unit. The bearing journal may have a bearing journal hole, an outer surface, and a threaded portion. The bearing journal hole may be disposed along an axis and may be adapted to receive an axle output shaft. The outer bearing journal surface may be disposed opposite the bearing journal hole. The threaded portion may be disposed proximate the outer bearing journal surface. The first roller bearing assembly may have a first inner race and a first outer race. The first inner race may be disposed on the outer bearing journal surface. The first outer race may be disposed opposite the first inner race and may rotatably support the differential unit. The adjuster ring may be disposed on the bearing journal between the body and the first roller bearing assembly. The adjuster ring may include a threaded region and a plurality of teeth. The threaded region may receive and mate with the threaded portion. The plurality of teeth may be disposed opposite the threaded region and may extend away from the axis. The plurality of teeth may define a set of openings that may be arranged around the axis. The locking fastener may be received in the locking fastener hole and in a member of the set of openings to inhibit rotation of the adjuster ring about the axis.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
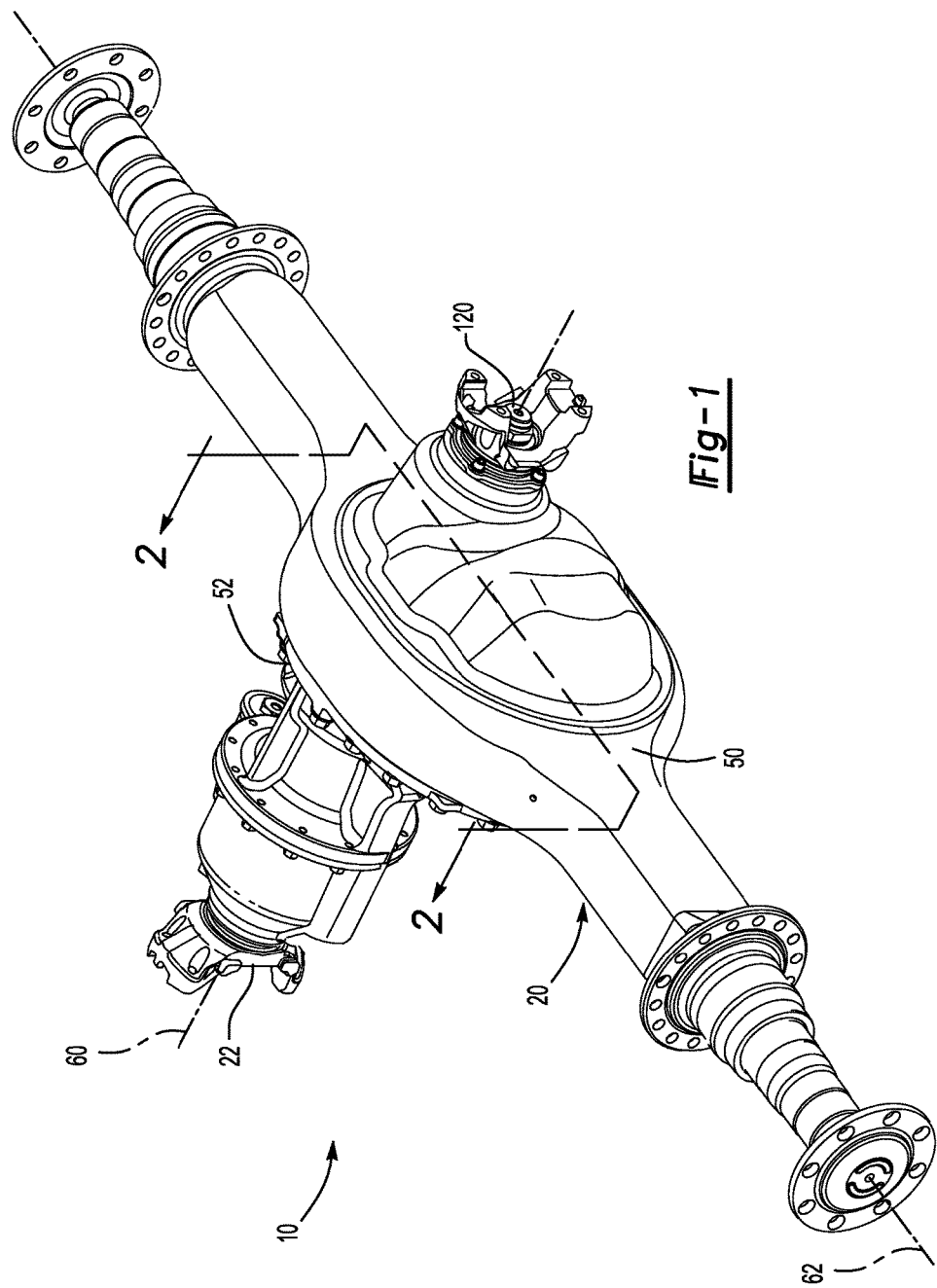
FIG. 1 is a perspective view of an axle assembly.

Referring to FIG. 1, an exemplary axle assembly 10 is shown. The axle assembly 10 may be provided with a vehicle, such as a motor vehicle like a truck, bus, farm equipment, military transport or weaponry vehicle, or cargo loading equipment for land, air, or marine vessels. The axle assembly 10 may be configured to provide torque to at least one associated wheel assembly.

Figure 2:
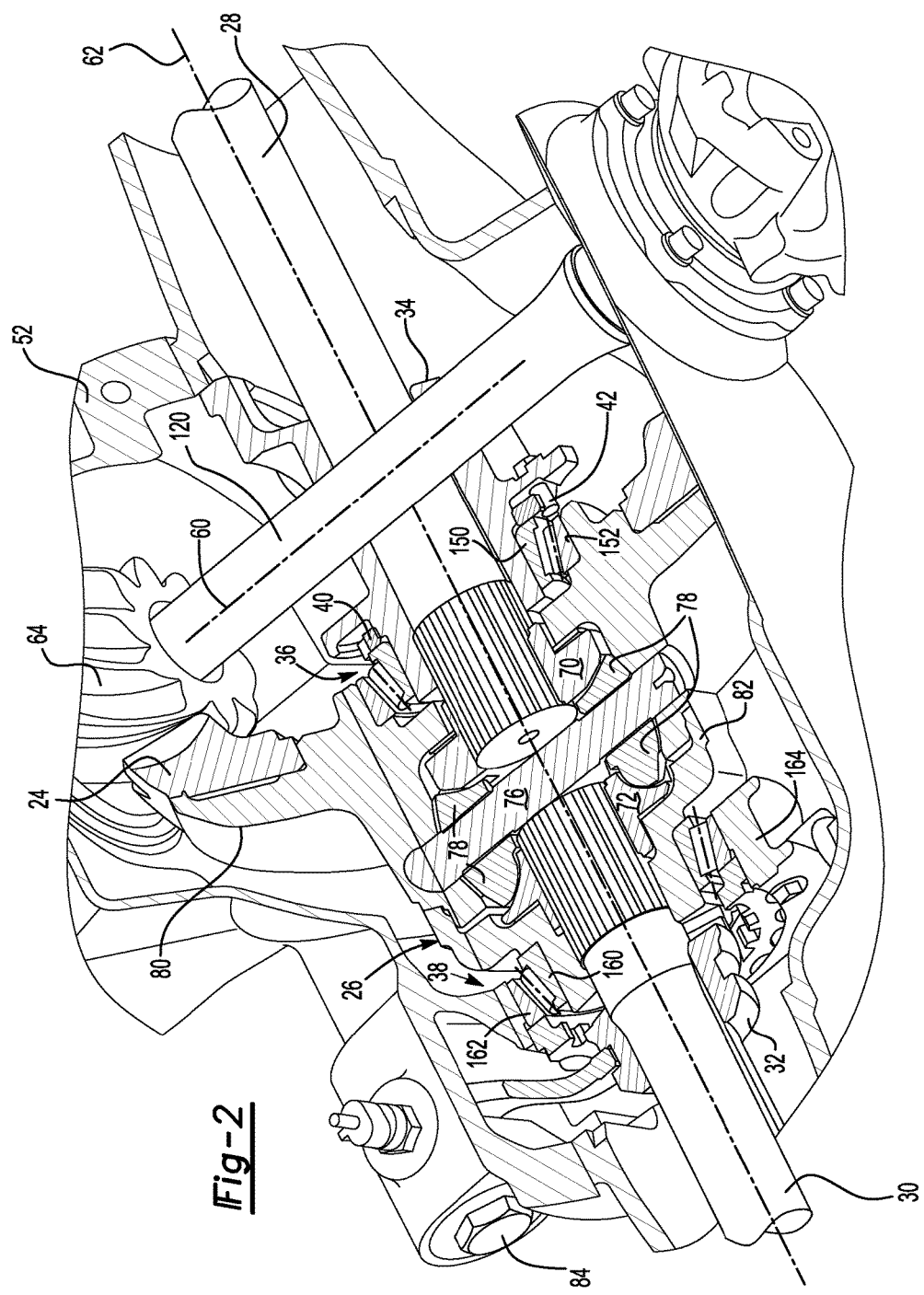
FIG. 2 is a section view of the axle assembly along section line 2-2.

As is best shown with reference to FIGS. 1 and 2, the axle assembly 10 may include a housing assembly 20, an input shaft 22, a ring gear 24, a differential unit 26, a first axle output shaft 28, a second axle output shaft 30, a clutch collar 32, a bearing support 34, a first roller bearing assembly 36, a second roller bearing assembly 38, an adjuster ring 40, and a locking fastener 42.

Referring to FIG. 1, the housing assembly 20 may receive various components of the axle assembly 10. In addition, the housing assembly 20 may facilitate mounting of the axle assembly 10 to the vehicle. In at least one embodiment, the housing assembly 20 may include an axle housing 50 and a differential carrier 52.

The axle housing 50 may receive the first axle output shaft 28 and the second axle output shaft 30 and may support corresponding wheel assemblies. The axle housing 50 may include a center portion and a pair of arm portions. The center portion may define an opening that may face toward the differential carrier 52 and may have a cavity that may receive at least a portion of a differential unit 26. The differential unit 26 may be configured to transmit torque to associated traction wheel assemblies via the first axle output shaft 28 and the second axle output shaft 30 and permit the traction wheel assemblies associated with the axle assembly 10 to rotate at different velocities.

The differential carrier 52 may be mounted on the axle housing 50. For example, the differential carrier 52 may be mounted on the center portion of the axle housing 50 with a plurality of fasteners, such as bolts. The differential carrier 52 may support the differential unit 26.

The input shaft 22 may receive torque from a power source. For example, the input shaft 22 may be operatively coupled to a transmission, a transfer case, or another axle assembly that may receive torque from a motor or engine. In at least one embodiment, the input shaft 22 may extend along and may rotate about a first axis 60. The input shaft 22 may be operatively connected to the ring gear 24 via a pinion gear or drive pinion 64 that may provide torque to the ring gear 24.

Referring to FIG. 2, the ring gear 24 may be configured to rotate about a second axis 62. The ring gear 24 may have a center hole and a set of teeth. The center hole may extend around the second axis 62. The set of teeth may be arranged around the center hole and may engage and mate with corresponding teeth on the drive pinion 64. The ring gear 24 may be mounted on the differential unit 26.

The differential unit 26 may be disposed in the housing assembly 20. The differential unit 26 may be rotatably supported by the first roller bearing assembly 36 and the second roller bearing assembly 38. The differential unit 26 may be configured to control rotation of the first axle output shaft 28 with respect to the second axle output shaft 30. For example, the differential unit 26 may permit the first and second axle output shafts 28, 30 to rotate at different speeds or inhibit the first and second axle output shafts 28, 30 from rotating at different speeds depending on the position of the clutch collar 32. In at least one embodiment, the differential unit 26 may include a first output gear 70, a second output gear 72, a case 74, a spider 76, and one or more pinion gears 78.

The first output gear 70 may be disposed on the first axle output shaft 28 and may rotate with the first axle output shaft 28. The first output gear 70 may include a set of teeth that may be arranged on a side or face of the first output gear 70 that faces toward the spider 76 and one or more pinion gears 78.

The second output gear 72 may be disposed opposite the first output gear 70. The second output gear 72 may be disposed on the second axle output shaft 30 and may rotate with the second axle output shaft 30. The second output gear 72 may also include a set of teeth that may be arranged on a side or face of the second output gear 72 that faces toward the spider 76 and one or more pinion gears 78.

The case 74 may receive various components of the differential unit 26. In at least one embodiment, the case 74 may include a first case portion 80 and a second case portion 82.

The first case portion 80 may support the ring gear 24. For example, the ring gear 24 may be fixedly disposed on the first case portion 80. In addition, the first case portion 80 may receive and may be rotatably supported by the first roller bearing assembly 36. As such, the ring gear 24 and the first case portion 80 may rotate together about the second axis 62. The first case portion 80 may include an opening that may extend around the second axis 62 and that may receive a portion of the first axle output shaft 28 and/or the first output gear 70.

The second case portion 82 may be fixedly disposed on the first case portion 80. The second case portion 82 may be received in and may be rotatably supported by the second roller bearing assembly 38. The second case portion 82 may include an opening that may extend around the second axis 62 and that may receive a portion of the second axle output shaft 30 and/or the second output gear 72.

The spider 76 may be disposed in the case 74 and may be configured to rotate about the second axis 62 with the case 74. The spider 76 may include one or more pins that may be received in the case 74 and may support a pinion gear 78.

A pinion gear 78 may be rotatably disposed on each pin of the spider 76. The pinion gear 78 may include a set of teeth that mate with the first output gear 70 and the second output gear 72.

The first axle output shaft 28 may extend along the second axis 62 and may help connect the axle assembly 10 to a vehicle wheel.

The second axle output shaft 30 may extend along the second axis 62 and may help connect the axle assembly 10 to another vehicle wheel.

The clutch collar 32 may slide axially along the second axle output shaft 30 to engage or disengage the case 74 and lock or unlock the differential unit 26. The clutch collar 32 may be operatively connected to an actuator 84 that may actuate the clutch collar 32.

Figure 3:
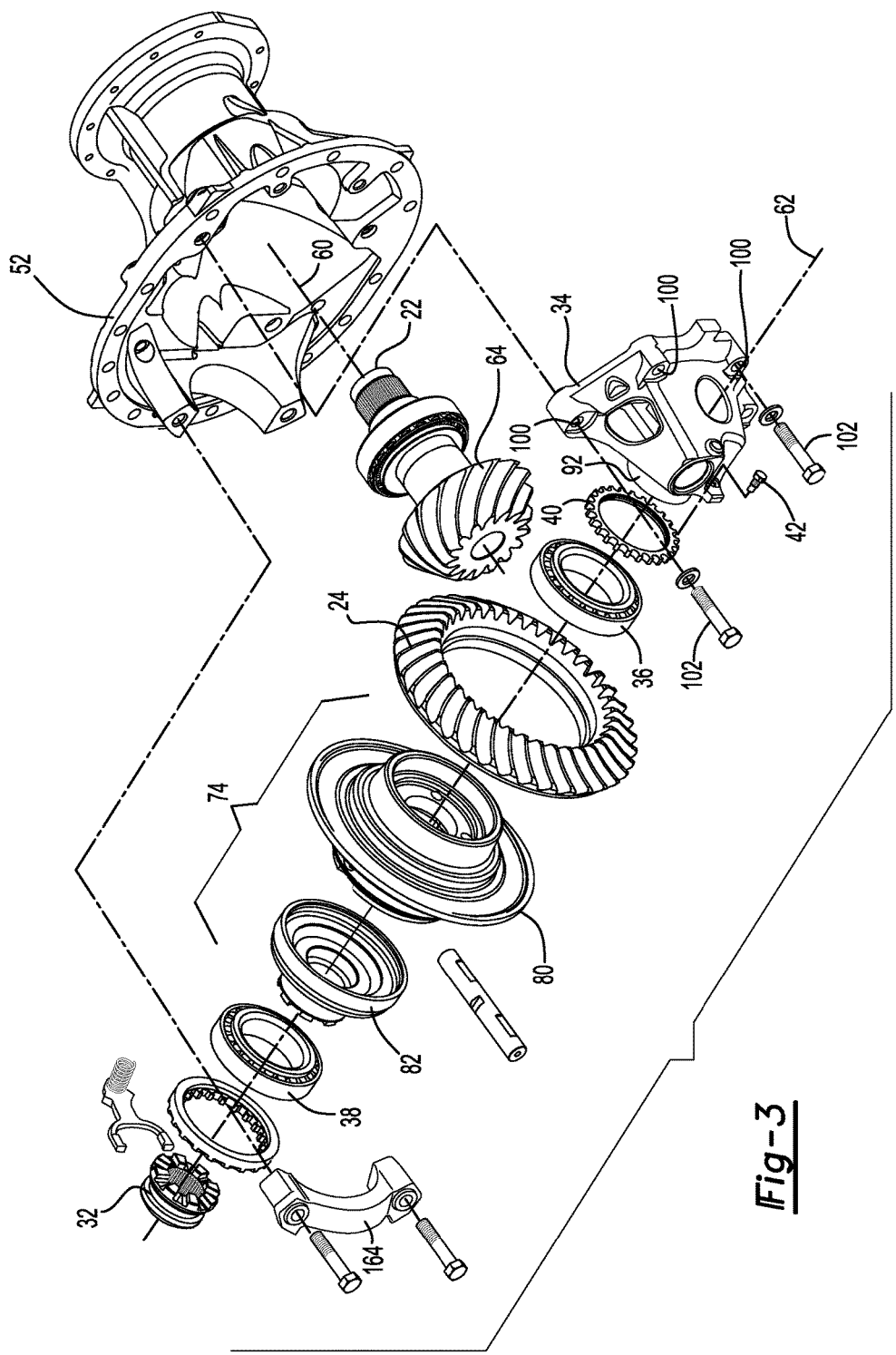
FIG. 3 is an exploded view of a portion of the axle assembly.
Figure 4:
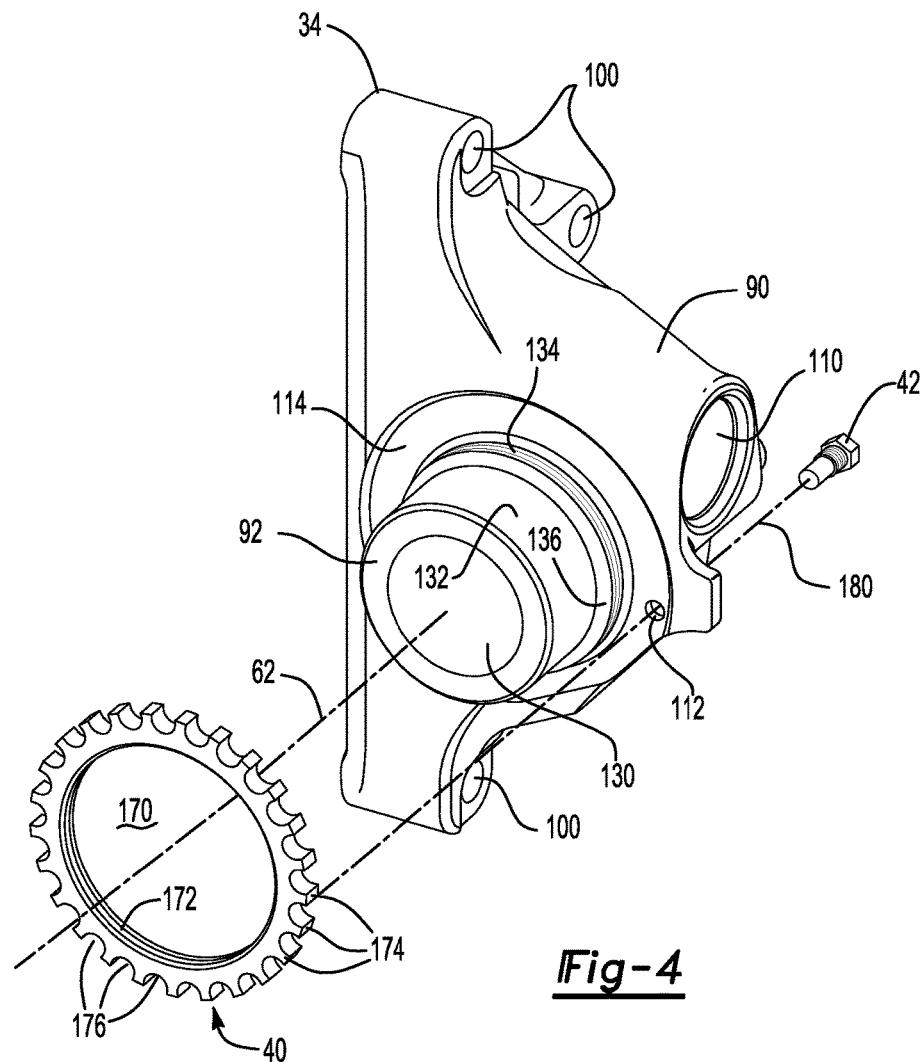
FIG. 4 is a perspective view of a bearing support and an adjuster ring of the axle assembly.

Referring to FIGS. 2-4, the bearing support 34 may be disposed on the housing assembly 20 and may support the first roller bearing assembly 36. The bearing support 34 may include a body 90 and a bearing journal 92.

The body 90 may be disposed on and may be mounted to the differential carrier 52. For example, the body 90 may include a plurality of fastener holes 100 that may each receive a fastener 102, such as a bolt, that may couple the body 90 to the differential carrier 52. As such, the bearing support 34 may be fixedly disposed on the differential carrier 52. As is best shown in FIG. 4, the body 90 may support the bearing journal 92 and may include a thru shaft hole 110, a locking fastener hole 112, and a face surface 114.

The thru shaft hole 110 may be disposed above the bearing journal 92 and may extend along the first axis 60. The thru shaft hole 110 may receive a thru shaft 120 that may provide torque to another axle assembly. As is best shown in FIG. 2, the thru shaft 120 may extend through the drive pinion 64 and may operatively connect the input shaft 22 to the input of another axle assembly.

The locking fastener hole 112 may be configured as a through hole that may extend through the body 90. As is best shown in FIG. 4, the locking fastener hole 112 may be disposed below the thru shaft hole 110 and may be spaced apart from the bearing journal 92. The locking fastener hole 112 may be a threaded hole that may receive the locking fastener 42 and may extend to the face surface 114.

The face surface 114 may extend around the bearing journal 92. As such, the face surface may face toward the first roller bearing assembly 36. The face surface 114 may be substantially planar and may be disposed substantially perpendicular to the second axis 62 in one or more embodiments.

The bearing journal 92 may extend from the body 90 toward the differential unit 26. For example, the bearing journal 92 may be disposed along the second axis 62 and may extend from the face surface 114 toward the first and second roller bearing assemblies 36, 38. In at least one embodiment, the bearing journal 92 may have a bearing journal hole 130, an outer bearing journal surface 132, a threaded portion 134, and a step surface 136.

The bearing journal hole 130 may be radially disposed with respect to the second axis 62. The bearing journal hole 130 may be a through hole that may extend through both the body 90 and the bearing journal 92 and may receive the first axle output shaft 28.

The outer bearing journal surface 132 may be disposed opposite the bearing journal hole 130. The outer bearing journal surface 132 may be radially disposed with respect to the second axis 62 and may extend from an end of the bearing journal 92 to the step surface 136.

The threaded portion 134 may also be disposed opposite the bearing journal hole 130 and may extend around the second axis 62. The threaded portion 134 may be disposed between the body 90 and the outer bearing journal surface 132. For example, the threaded portion 134 may be disposed between the step surface 136 and the face surface 114. In addition, the threaded portion 134 may be disposed further away from the second axis 62 than the outer bearing journal surface 132.

The step surface 136 may be disposed between the face surface 114 and the outer bearing journal surface 132. For example, the step surface 136 may extend away from the second axis 62 and may extend from the outer bearing journal surface 132 to the threaded portion 134. The step surface 136 may be disposed substantially perpendicular to the second axis 62.

Referring primarily to FIG. 2, the first roller bearing assembly 36 may extend around the second axis 62 and may rotatably support the differential unit 26. The first roller bearing assembly 36 may include a plurality of rolling elements, such as balls or rollers, which may be disposed between a first inner race 150 and a first outer race 152. The first inner race 150 may be disposed on and may engage the outer bearing journal surface 132 of the bearing journal 92. As such, the first inner race 150 may engage the bearing journal 92 of the bearing support 34. The first outer race 152 may be disposed opposite and may extend around the first inner race 150. The first outer race 152 may be disposed proximate and may engage the case 74 of the differential unit 26. As such, the first outer race 152 may support the differential unit 26 and the ring gear 24.

The second roller bearing assembly 38 may also extend around the second axis 62 and may rotatably support the differential unit 26. The second roller bearing assembly 38 may include a plurality of rolling elements, such as balls or rollers, which may be disposed between a second inner race 160 and a second outer race 162. The second inner race 160 may be disposed on the case 74 of the differential unit 26. The second outer race 162 may be disposed opposite and may extend around the second inner race 160. The second outer race 162 may be disposed proximate and may engage the differential carrier 52 and a bearing cap 164 that may be coupled to the differential carrier 52. The first roller bearing assembly 36 and the second roller bearing assembly 38 may be tapered roller bearings that may be tapered at a common angle or in a common direction.

No shims or spacers may be provided to position the first roller bearing assembly 36 or the second roller bearing assembly 38. More specifically, shims or spacers may not be provided between an inner race and the case 74 of the differential unit 26 to adjust the axial positioning of an inner race and properly set gear tooth contact positions between the ring gear 24 and the drive pinion 64. Installation of a shim may require that the differential unit 26 be disassembled from the differential carrier 52 and the inner race be removed from a bearing journal, which increases assembly time and could result in damage to the inner race.

Referring to FIGS. 2 and 4, the adjuster ring 40 may be disposed on the threaded portion 134 of the bearing journal 92. The adjuster ring 40 may be axially disposed between the body 90 of the bearing support 34 and the first roller bearing assembly 36 and may be configured to engage the first inner race 150. In addition, the adjuster ring 40 or at least a portion thereof may be radially disposed between the bearing journal 92 and the locking fastener 42. As is best shown in FIG. 4, the adjuster ring 40 may extend continuously around the second axis 62 and may include an adjuster ring hole 170, a threaded region 172, a plurality of teeth 174, and a set of openings 176.

The adjuster ring hole 170 may extend around and may receive the bearing journal 92.

The threaded region 172 may be provided on an inner surface of the adjuster ring 40. As such, the threaded region 172 may be disposed in or may at least partially define the adjuster ring hole 170. The threaded region 172 may receive and mate with the threaded portion 134 of the bearing support 34. More specifically, the threaded region 172 may engage the threaded portion 134 such that rotation of the adjuster ring 40 relative to the bearing journal 92 may adjust the position of the adjuster ring 40 and the first inner race 150 along the second axis 62 and preload force exerted by the adjuster ring 40 on the first and second roller bearing assemblies 36, 38. In turn, rotation of the adjuster ring 40 may adjust the axial position of the case of the differential unit 26 and the ring gear 24 along the second axis 62 relative to the drive pinion 64.

The plurality of teeth 174 may be disposed opposite the threaded region 172 and may extend away from the second axis 62. The teeth 174 may be arranged around the second axis 62 and may define the set of openings 176. The teeth 174 may also facilitate rotation of the adjuster ring 40. For example, a tool like a wrench may engage the teeth 174 or may be received in one or more openings 176 between the teeth 174 such that the tool may rotate the adjuster ring 40 about the second axis 62 to achieve the desired position and/or bearing preload force.

The set of openings 176 may be disposed opposite the adjuster ring hole 170 and the threaded region 172. The openings 176 may be arranged around the second axis 62 such that each opening 176 may be disposed between two adjacent teeth 174. In the embodiment shown in FIG. 4, each opening 176 has a generally semicircular shape that is open in a direction that faces away from the second axis 62. Alternatively, it is contemplated that the openings 176 may be provided with other shapes or may be configured as through holes that may be completely defined in the adjuster ring 40 between the inner surface and an outer surface disposed opposite the inner surface, in which case the teeth 174 may be omitted.

The locking fastener 42 may inhibit rotation of the adjuster ring 40 about the second axis 62. For example, the locking fastener 42 may extend through the locking fastener hole 112 of the bearing support 34 and may be received in a member of the set of openings 176 of the adjuster ring 40 after the adjuster ring 40 is tightened to exert a desired preload force on at least one of the first roller bearing assembly 36 and the second roller bearing assembly 38. As such, the locking fastener 42 may engage the adjuster ring 40 and may be coupled to the bearing support 34 to inhibit rotation of the adjuster ring 40 about the second axis 62. The locking fastener 42 may extend along a locking fastener axis 180. The locking fastener axis 180 may extend substantially parallel to the second axis 62, but may be offset and spaced apart from the second axis 62. In addition, the locking fastener 42 may be disposed below the thru shaft hole 110 as is best shown in FIG. 4. The locking fastener 42 may have any suitable configuration. For instance, the locking fastener 42 may be a threaded fastener, such as a bolt or screw.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
a housing assembly;
a bearing support disposed on the housing assembly, the bearing support including:
a body that has a locking fastener hole; and
a bearing journal that extends from the body, the bearing journal having a bearing journal hole that is disposed along an axis and is adapted to receive an axle output shaft, an outer bearing journal surface disposed opposite the bearing journal hole, and a threaded portion;
a first roller bearing assembly that has a first inner race that is disposed on the outer bearing journal surface and a first outer race disposed opposite the first inner race that facilitates rotation of a ring gear;
an adjuster ring that is disposed on the bearing journal and the first inner race and includes:
a threaded region that receives and mates with the threaded portion; and
a set of openings that are arranged around the axis; and
a locking fastener that is received in the locking fastener hole and in a member of the set of openings to inhibit rotation of the adjuster ring about the axis.

2. The axle assembly of claim 1 wherein the housing assembly has a differential carrier and the bearing support is fixedly disposed on the differential carrier.

3. The axle assembly of claim 1 wherein the adjuster ring is disposed on the bearing journal between the body and the first inner race.

4. The axle assembly of claim 1 wherein the set of openings are disposed opposite the threaded region.

5. The axle assembly of claim 1 wherein the set of openings is defined by a plurality of teeth that extends away from the axis.

6. The axle assembly of claim 1 wherein the threaded region is disposed on an inner surface of the adjuster ring and engages the threaded portion such that rotating the adjuster ring relative to the bearing journal adjusts a position of the ring gear relative to a drive pinion.

7. The axle assembly of claim 6 wherein the threaded portion of the bearing support is disposed further from the axis than the outer bearing journal surface.

8. The axle assembly of claim 7 wherein the bearing journal further comprises a step surface that extends from the outer bearing journal surface to the threaded portion, wherein the step surface is disposed substantially perpendicular to the axis.

9. The axle assembly of claim 8 wherein the threaded portion extends between the body and the step surface.

10. The axle assembly of claim 7 wherein the body has a thru shaft hole that is adapted to receive a thru shaft that extends through the drive pinion.

11. The axle assembly of claim 10 wherein the locking fastener is disposed below the thru shaft hole.

12. The axle assembly of claim 10 wherein the locking fastener extends along a locking fastener axis that is spaced apart from and disposed substantially parallel to the axis.

13. An axle assembly comprising:
a differential carrier;
a bearing support including:
a body that is disposed on the differential carrier and that has a locking fastener hole; and
a bearing journal that extends from the body toward a differential unit, the bearing journal having a bearing journal hole that is disposed along an axis and is adapted to receive an axle output shaft, an outer bearing journal surface disposed opposite the bearing journal hole, and a threaded portion;
a first roller bearing assembly that has a first inner race that is disposed on the outer bearing journal surface and a first outer race disposed opposite the first inner race that rotatably supports the differential unit;
an adjuster ring that is disposed on the bearing journal between the body and the first roller bearing assembly, the adjuster ring including:
a threaded region that receives and mates with the threaded portion; and
a plurality of teeth that are disposed opposite the threaded region and extend away from the axis, wherein the plurality of teeth define a set of openings that are arranged around the axis; and
a locking fastener that is received in the locking fastener hole and in a member of the set of openings to inhibit rotation of the adjuster ring about the axis.

14. The axle assembly of claim 13 wherein members of the set of openings have a generally semicircular shape.

15. The axle assembly of claim 13 further comprising a second roller bearing assembly that rotatably supports the differential unit, wherein the bearing journal extends from the body toward the second roller bearing assembly.

16. The axle assembly of claim 15 wherein the second roller bearing assembly engages the differential unit and no shims are provided between the second roller bearing assembly and the differential unit.

17. The axle assembly of claim 13 wherein the first inner race engages the bearing support and the first outer race engages a case of the differential unit.

18. The axle assembly of claim 17 wherein a ring gear is fixedly disposed on the case.

19. The axle assembly of claim 13 wherein the body of the bearing support includes a face surface that extends around the bearing journal, wherein the locking fastener hole extends through the face surface.

20. The axle assembly of claim 13 wherein the adjuster ring is disposed between the bearing journal and the locking fastener.

* * * * *